(12) United States Patent
Robotham

(10) Patent No.: US 6,375,195 B1
(45) Date of Patent: Apr. 23, 2002

(54) SEALING ASSEMBLY

(75) Inventor: Michael Robotham, Chesterfield (GB)

(73) Assignee: SMS Demag AG (DE)

( * ) Notice: Subject to any disclaimer, the term of this patent is extended or adjusted under 35 U.S.C. 154(b) by 0 days.

(21) Appl. No.: 09/598,121

(22) Filed: Jun. 21, 2000

(30) Foreign Application Priority Data

Jun. 22, 1999 (GB) .............................................. 9914442

(51) Int. Cl.[7] .............................................. F16J 15/34
(52) U.S. Cl. ........................ 277/394; 277/402; 277/572
(58) Field of Search ................................. 277/394, 395, 277/402, 353, 423, 427, 551, 572; 384/147, 484, 485

(56) References Cited

U.S. PATENT DOCUMENTS

| 2,868,574 A | * | 1/1959 | Rich |
| 3,822,890 A | * | 7/1974 | Bourgeois |
| 4,063,743 A | * | 12/1977 | Petros |
| 4,071,255 A | * | 1/1978 | Salter, Jr. |
| 4,389,053 A | * | 6/1983 | Innis, Jr. et al. |
| 4,435,096 A | * | 3/1984 | Petros .......................... 384/147 |
| 4,455,856 A | * | 6/1984 | Salter, Jr. et al. ............. 72/236 |
| 4,585,236 A | * | 4/1986 | Simmons et al. |
| 5,316,392 A | * | 5/1994 | Innis, Jr. ...................... 384/147 |
| 5,556,112 A | * | 9/1996 | Brandt |

FOREIGN PATENT DOCUMENTS

JP 10-109105 * 4/1998

* cited by examiner

Primary Examiner—Anthony Knight
Assistant Examiner—Alison K. Pickard
(74) Attorney, Agent, or Firm—Factor & Partners, LLC

(57) ABSTRACT

The present invention relates to a sealing assembly for use in a rolling mill in which a reliable and rigid mounting surface on the seal end plate and a detachable seal retaining plate improves the efficiency of the coolant seal without need of separate fasteners for fastening the coolant seal to the seal end plate. Moreover when the seal retaining plate has worn it may be readily removed and replaced cheaply.

10 Claims, 1 Drawing Sheet

SEALING ASSEMBLY

Figure 1:
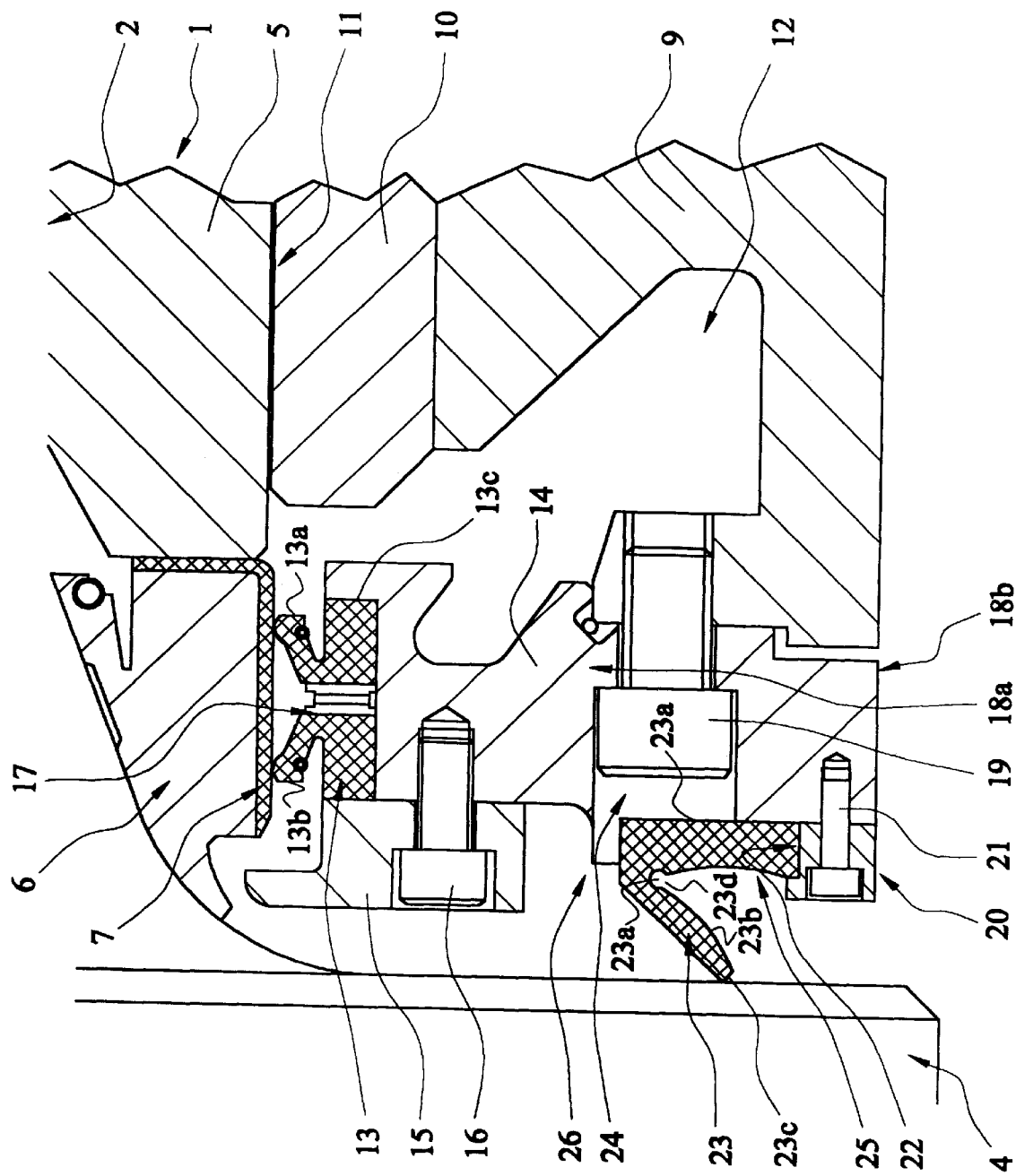

The present invention relates to a sealing assembly for use in a rolling mill.

A rolling mill may be operated under wet conditions in which water (or other coolant) is fed over the roll. A certain amount of water is inevitably dispersed into the direction of the roll neck and the lubricated areas of the bearing assembly. A sealing assembly may be used on the tapered section of the roll neck in order to maintain a liquid barrier between the rod and the bearing assembly.

Frequently, the sealing assembly includes a coolant seal positioned on a seal end plate which is fixed to the bearing chock. The coolant seal is generally secured on a mounting surface of the seal end plate and contacts the roll end face thereby providing a barrier to ingress of coolant and contaminants into the main bearing assembly.

One such conventional sealing assembly is described in GB-A-2137701 (Morgan Construction Company). This particular arrangement comprises a coolant seal with a radially disposed mounting flange integrally joined at its inner edge to a sealing flange extending angularly and flexibly therefrom towards the roll face. The mounting flange has a series of holes through which screws may be passed and threaded into circumferentially spaced holes in the seal end plate. The mounting flange is provided with an integral circular bumper axially protruding towards the roll end face.

One drawback of the coolant seal arrangement in known bearing assemblies is that when secured in position the coolant seal fails to provide an efficient contact at the interface with the seal end plate. This may have serious consequences where water is allowed to pass between the two surfaces.

The present invention seeks to overcome this disadvantage of the prior art assemblies by improving the contact between the coolant seal and the seal end plate. In addition, the invention mounts the coolant seal more rigidly than in is possible in the prior art assemblies.

Thus viewed from one aspect the present invention provides a sealing assembly for use in conjunction with the rotatable tapered section of a roll neck which is part of a roll in a rolling mill, said sealing assembly having a first bearing element mounted on said rotatable tapered section and at least partially opposing a fixed second bearing element to define a contact surface therebetween which is adapted to receive lubricant, wherein said fixed second bearing element or said first bearing element comprises a flexible seal element axially positioned between the contact surface and the roll end face and mounted on a seal end plate, wherein the face of said seal end plate adjacent the roll end face is provided with an annular recess defined at one edge by a circular surface on a portion of the seal end plate and at the opposite edge by a circular surface of a seal retaining means (eg seal retaining plate) which is detachably secured to the seal end plate, wherein a substantially annular part of a coolant seal is mounted in the annular recess of the seal end plate.

The sealing assembly of the invention improves the efficiency of the coolant seal by providing a reliable and rigid mounting surface on the seal end plate. The absence of separate fasteners for fastening the coolant seal to the seal end plate adds to the improved efficiency of the coolant seal. It is well known in the art that the outermost circumferential edge of the seal end plate undergoes wear during axial "floating" of the assembly in use. An added benefit of the assembly according to the invention is that when the seal retaining means has worn it may be readily removed and replaced cheaply.

In a preferred embodiment, the circular surface on the seal end plate is provided by a circular shoulder or flange axially disposed on the face of the seal end plate adjacent to the roll end face.

In one embodiment, the seal retaining means is secured proximate the outer circumferential edge of the seal end plate. Preferably, the seal retaining means comprises a substantially L-shaped cross-section which serves to encapsulate the outermost circumferential edge of the substantially annular part of the coolant seal. The base of the substantially L-shaped cross-section is preferably thickened and adapted to receive a fastener (eg a screw)

Preferably, the coolant seal comprises a radially disposed, annular mounting flange adapted to be mounted in the annular recess of the seal end plate. Particularly preferably, the annular mounting flange comprises a planar rear surface and a planar or curved front surface.

Preferably, the coolant seal comprises a sealing flange angularly disposed from the inner edge of the annular mounting flange. The sealing flange is advantageously non-uniform between its sealing contact point at the roll end face and the portion connected to the mounting flange. This helps to maintain the sealing contact. The section between the contact point and the connecting portion is conveniently thickened to stiffen the sealing flange and minimise bending. Preferably the root of the sealing flange is provided with a circumferential notch which assists in minimising local distortion of the mounting flange during rotation due to axial movement of the roll end face.

In one embodiment, the flexible seal element is mounted on the fixed second bearing element. The fixed second bearing element therefore comprises the seal end plate upon which the seal element is mounted.

Preferably, the flexible seal element comprises a substantially annular body and one or more (preferably two) circumferential lips inwardly disposed from the substantially annular body. Particularly preferably, the or each inwardly disposed circumferential lip is angularly disposed. Especially preferably, the or each circumferential lip is attached at the central section of the substantially annular body. For example, each circumferential lip may be attached by shoulders radially raised on the inner surface of the annular body and conveniently axially spaced apart. Preferably the seal element is substantially axially symmetrical. A lantern ring may be incorporated in the seal element to drain out any oil which does penetrate the seal element.

In the preferred embodiment, the or each circumferential lip is provided with an enlarged peripheral end. Preferably, the enlarged peripheral end is multi-faceted. For example, the enlarged peripheral end may comprise five annular faces. Preferably the enlarged peripheral end is provided with a reduced point arranged to contact the first bearing element in use. In use, the circumferential lips of the flexible seal element may be deformable in order to adopt a stressed state. The force acting in opposition to the stressing may improve the seal between the peripheral end of the lips and the contact surface. The peripheral end may be conveniently provided with a cut-away portion for encapsulating a garter spring which may further improve the seal.

In the preferred embodiment of the invention, the peripheral end of the or each circumferential lip is seated on the first bearing element of the sealing assembly. For this purpose, the first bearing element may be provided with a carrier ring mounted on the tapered portion of the roll neck and providing a substantially horizontal running surface. Preferably, the carrier ring is coated with a metal coating, particularly preferably a chrome coating which acts as the horizontal running surface. This is advantageous over conventional ceramic-based coatings which have been found to lead to significant deterioration of the seal element and which are unable to remove the significant amounts of heat which are generated. In the latter regard, chrome possesses excellent heat dissipation properties.

The seal end plate may comprise an axial recess (eg an annular recess) in which at least the annular body of the flexible seal element is located. On the roll side, the seal end plate may be provided with a clamp for retaining the seal element in the recess. One inner face of the clamp advantageously forms the outer face of the recess in which the seal element is located thereby permitting easy access to the recess for installation/removal of the seal element and visual checking of the seal element. The clamp may be provided with an appropriate fastener for ease of removal.

The seal end plate may be mounted adjacent and attached to the chock on the non-roll side. Conventional fastening means may be appropriate for this purpose. In one embodiment, the seal end plate comprises a plurality of spaced apart apertures capable of receiving fastening means for securing the seal end plate to the chock. Preferably the openings of the plurality of apertures are located in the annular recess.

In accordance with the invention, the first bearing element preferably comprises a sleeve mounted on the rotatable roll neck in a conventional manner (eg keyed). The fixed second bearing element preferably comprises a fixed bushing carried in a bearing chock. The sleeve is conveniently provided with an outer surface which is adapted to be rotatable within an inner surface of the fixed bushing thereby defining the contact surface at the axial side of the seal element opposite to the roll side. Lubricant is fed to the contact surface and an extended portion of the chock may conveniently serve as an oil reservoir for drainage and re-circulation purposes.

The present invention will now be described in a non-limitative sense with reference to the accompanying FIGURE in which:

FIG. 1 illustrates a preferred embodiment of the seal assembly of the invention in cross-sectional view.

FIG. 1 illustrates a roll neck sealing assembly in cross-sectional view designated generally by reference numeral 1. The assembly is positioned adjacent to the tapered section 3 of a roll neck 2 in a rolling mill. Roll 4 is illustrated in truncated form.

The sealing assembly 1 mounted on the rotatable roll neck 3 comprises a first bearing element. The first bearing element comprises sleeve 5 and moulded seal carrier ring 6. The moulded seal carrier ring 6 is mounted on the tapered section 3 of roll neck 2 and is adapted to provide a horizontal running sleeve 7 for flexible seal element 13. The outer flange of the moulded seal carrier ring 6 is provided with a garter spring 8 in a conventional manner.

The fixed second bearing element of the assembly 1 comprises bushing 10 carried in chock 9. The bushing 10 and sleeve 5 are at least partially opposed to define a contact surface 11. In use, the contact surface 11 between rotating sleeve 5 and fixed bushing 10 is oil-filled. The end of the chock 9 provides a reservoir 12 in which oil may be collected for drainage purposes and re-circulation.

The fixed second bearing element includes the seal element 13 made of a suitable flexible material provided with a conventional lantern ring 17. The seal element 13 comprises two circumferential lips 13a,13b angularly disposed from the central section of the annular main body 13c. Each lip terminates in a multi-faceted, enlarged head provided with reduced contact points which in use are seated on running surface 7 and with garter springs in suitable cutaway portions.

The annular main body 13c of seal element 13 is located in a suitably shaped axial annular recess in the inner circumferential edge of a seal lend plate 14. The recess is defined on one edge by a face of a separate clamping means 15 removably secured by cap head screw 16. This arrangement permits easy access to the recess for removal/installation of seal element 13 and makes the seal element 13 visible for inspection purposes.

The seal end plate 14 is provided with a plurality of circumferentially spaced apart apertures, one of which is referred to by numeral 24. Each aperture 24 is capable of receiving a cap head screw 19 which secures flange 9a of chock 9 against the internal face of the seal end plate. The internal edge of each aperture is provided with an annular abutment surface 18a against which the head of cap head screw abuts.

The roll-side axial face of seal end plate is provided with an annular recess 25 defined at one edge by annular shoulder 26 of seal end plate 14. The opposite edge of the annular recess 25 is defined by a separate seal retaining plate 20 which is detachably secured proximate the outer circumferential edge 18b of seal end plate 14 by means of cap head screw 21.

The seal assembly 1 additionally comprises a coolant seal 23 having a radial mounting flange 23a integrally attached at its inner edge to a sealing flange 23b extending angularly and flexibly therefrom towards the roll face 4. The seal retaining plate 20 has a substantially L-shaped cross-section which serves to encapsulate the outermost circumferential edge 22 of the radial mounting flange of coolant seal 23. The sealing flange 23b is non-uniform and has a thickened portion in between the contact point 23c and the connecting portion 23d. The root of the sealing flange is provided with a notch 23e which assists in minimising local distortion of the mounting flange during rotation due to axial movement of the roll end face.

We claim:

1. A sealing assembly for use in conjunction with the rotatable tapered section of a roll neck which is part of a roll in a rolling mill, said sealing assembly having a first bearing element mounted on said rotatable tapered section and at least partially opposing a fixed second bearing element to define a contact surface therebetween which is adapted to receive lubricant, wherein said fixed second bearing element or said first bearing element comprises a flexible seal element axially positioned between the contact surface and the roll end face and mounted on a seal end plate, wherein the face of said seal end plate adjacent the roll end face is provided with an annular recess defined at one edge by a circular surface on a portion of the seal end plate and at the opposite edge by a circular surface of a seal retaining means which is detachably secured to the seal end plate, wherein a substantially annular part of a coolant seal is mounted in the annular recess of the seal end plate, and the seal retaining means comprises a substantially L-shaped cross-section which serves to encapsulate the outermost circumferential edge of the substantially annular part of the coolant seal.

2. A sealing assembly as claimed in claim 1 wherein the seal retaining means is a seal retaining plate.

3. A sealing assembly as claimed in claim 1 wherein the circular surface on the seal end plate is provided by a circular shoulder or flange axially disposed on the face of the seal end plate adjacent to the roll end face.

4. A sealing assembly as claimed in claim 1 wherein the seal retaining means is secured proximate the outer circumferential edge of the seal end plate.

5. A sealing assembly as claimed in claim 1 wherein the base of the substantially L-shaped cross-section is thickened and adapted to receive a fastener.

6. The sealing assembly as claimed in claim 1 wherein the coolant seal comprises a radially disposed, annular mounting flange adapted to be mounted in the annular recess of the seal end plate.

7. A sealing assembly as claimed in claim 6 wherein the annular mounting flange comprises a planar rear surface and a planar or curved front surface.

8. The sealing assembly as claimed in claim 1 wherein the coolant seal comprises a sealing flange angularly disposed from the inner edge of the annular mounting flange.

9. A selaing assembly as claimed in claim 8 wherein the sealing flange is non-uniform between its sealing contact point at the roll end face and the portion connected to the mounting frame.

10. A sealing assembly as claimed in claim 8 wherein the root of the sealing flange is provided with a circumferential notch.

\* \* \* \* \*